June 29, 1943.   F. J. MAYWALD, JR   2,322,766
MACHINE FOR MAKING CERTAIN RUBBER GOODS
Filed Sept. 25, 1940   3 Sheets-Sheet 1

INVENTOR.
Frederick J. Maywald, Jr.
BY Kock & Blum
ATTORNEYS

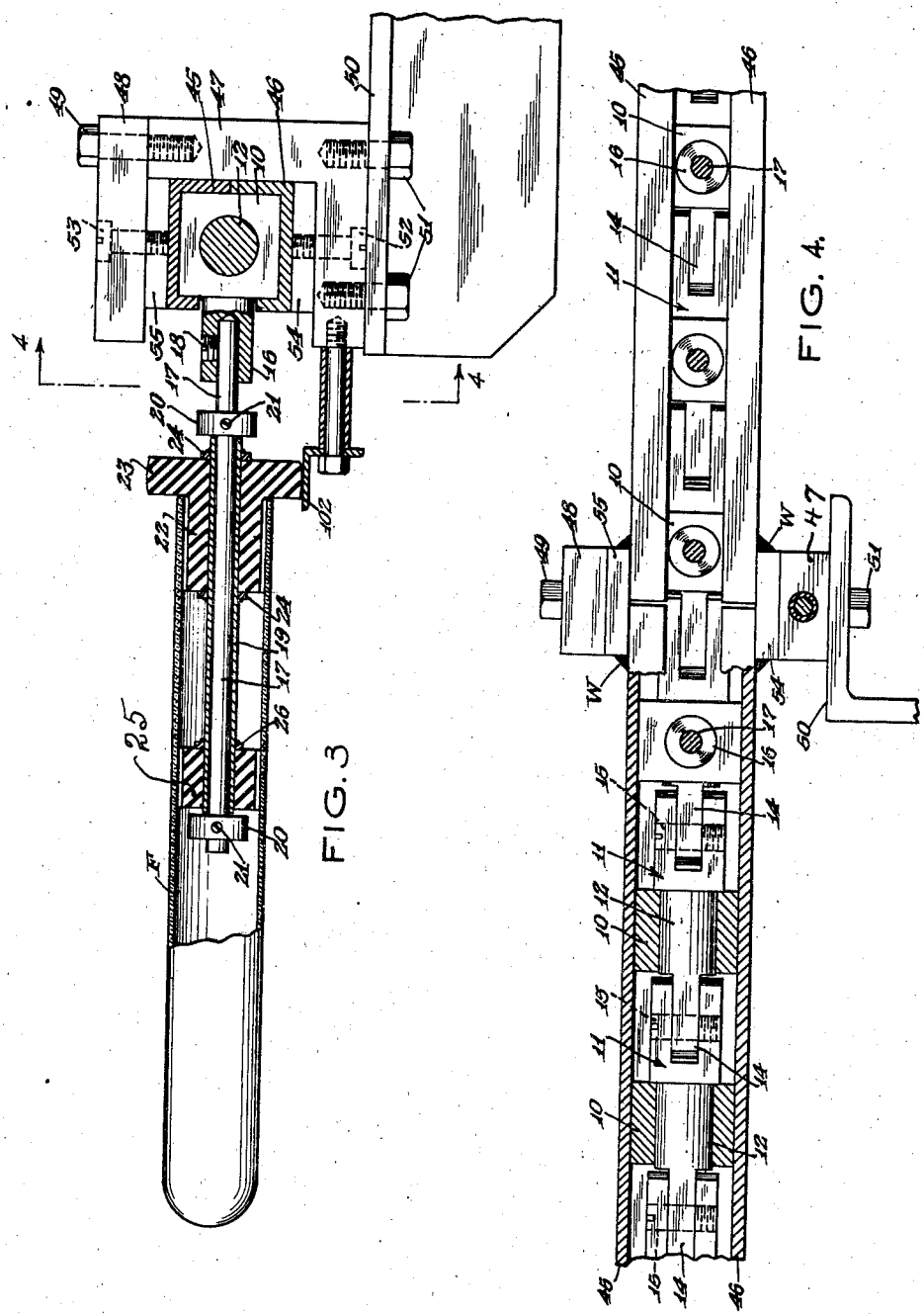

June 29, 1943.   F. J. MAYWALD, JR   2,322,766
MACHINE FOR MAKING CERTAIN RUBBER GOODS
Filed Sept. 25, 1940    3 Sheets-Sheet 3
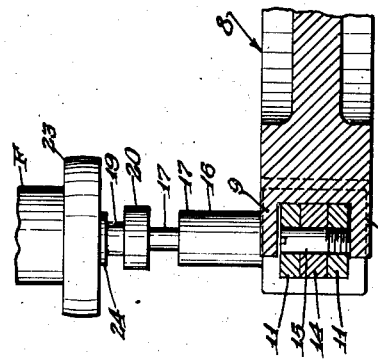
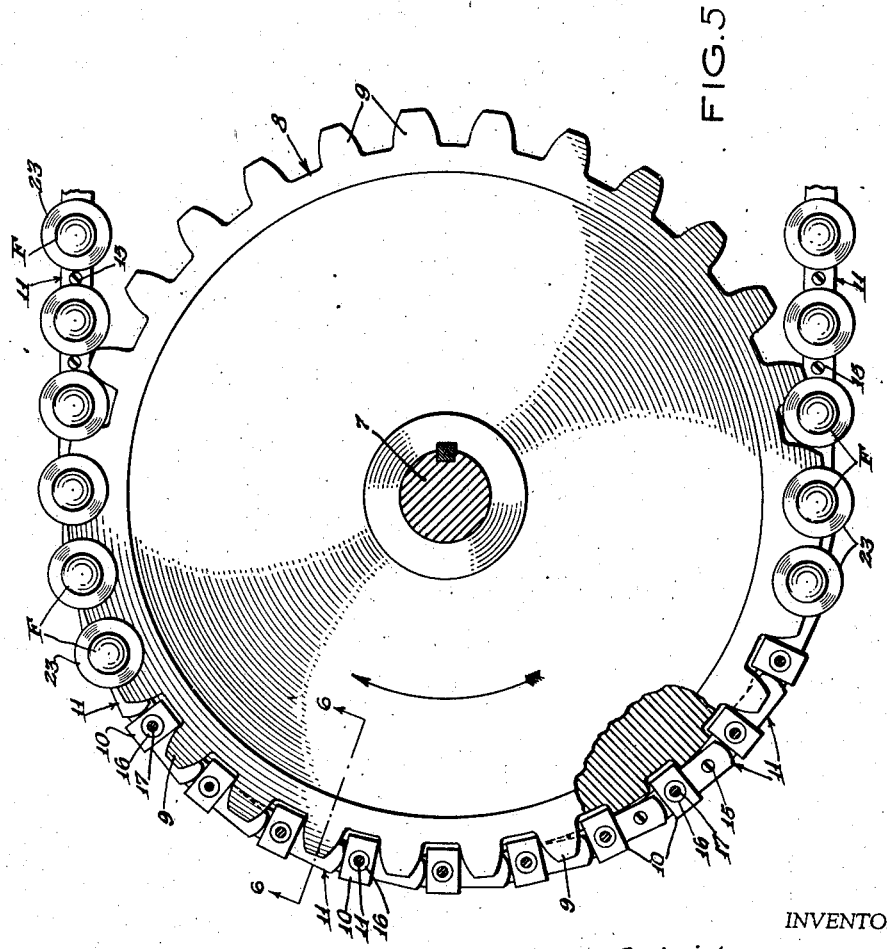
INVENTOR.
Frederick J. Maywald, Jr.
BY   Mock & Blum
ATTORNEYS Patented June 29, 1943

2,322,766

UNITED STATES PATENT OFFICE 2,322,766

MACHINE FOR MAKING CERTAIN RUBBER GOODS

Frederick J. Maywald, Jr., Rutherford, N. J., assignor to Allied Latex Corporation, East Newark, N. J., a corporation of New Jersey Application September 25, 1940, Serial No. 358,231

6 Claims. (Cl. 198—137)

My invention relates to a new and improved machine for making certain rubber goods, such as toy balloons, rubber gloves and the like.

One of the objects of the invention is to provide a simple and efficient machine, which has few parts, which will remain in order.

Another object of the invention is to provide a machine in which the forms are turnably connected to blocks which are connected to an endless conveyor, said machine having guide means which are shaped to automatically turn said blocks relative to the longitudinal axis of the conveyor, in order to maintain the forms upright, or inverted, or horizontal, or in any position between the upright and the inverted positions.

Another object of the invention is to provide a machine in which each form is provided with a single roller which turns in unison with the respective form, thus eliminating idler rolls, and holding each form reliably with its axis parallel to a predetermined line, during the beading operation.

Another object of the invention is to moisten the end portions of the rubber objects which are subjected to the action of the beading mechanism, prior to the performance of the beading operation, in order to facilitate the proper and uniform operation of the beading devices.

Other objects of my invention will be set forth in the following description and drawings which illustrate certain preferred embodiments, it being understood that the above statement of the objects of my invention is intended to generally explain the same without limiting it in any manner.

Fig. 3 is a sectional view, partially in elevation.

Fig. 4 is another detail sectional view on the line 4—4 of Fig. 3.

Fig. 5 is an enlarged plan view, partially in section, of the driving sprocket which is shown at the left-hand side of Fig. 1.

Fig. 6 is a sectional view on the line 6—6 of Fig. 5.

Figure 1:
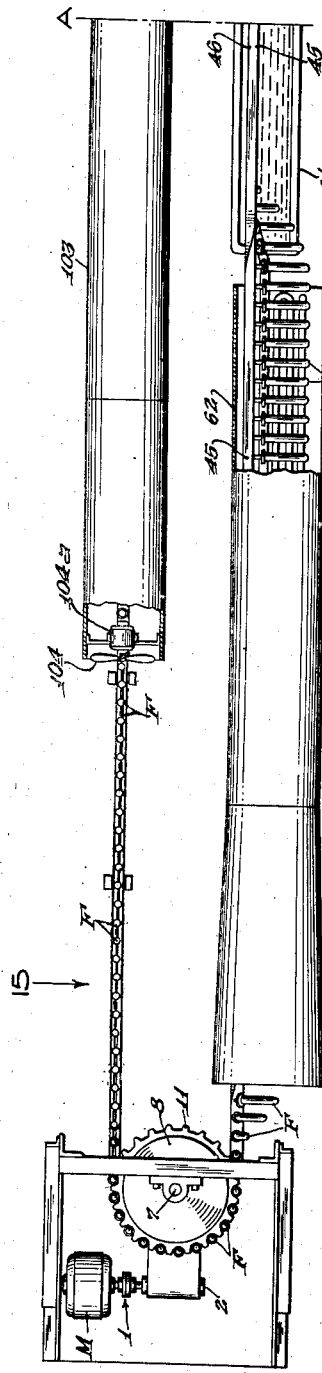
Fig. 1 is a top plan view of a part of the machine.

As shown in Fig. 1 a motor M, which may be an electric motor of any suitable type, is connected by means of a conventional flexible coupling 1 to a shaft 2. The horizontal shaft 2 is connected to a vertical shaft 3, by means of conventional reduction gearing which is located in a gear box 4. The shaft 3 is provided with a gear 5, which meshes with a larger gear 6 on the shaft 7. At its upper end, the vertical shaft 7 is provided with a sprocket 8, which is shown in detail in Figs. 5 and 6. The flange of the sprocket 8 is provided with a circumferential recess, thus providing spaced top and bottom walls which are cut so as to provide superposed pairs of teeth 9. An endless conveyor is driven by means of the sprocket 8. In this embodiment, the endless conveyor is in the form of a chain which consists of pivoted links. This chain is shown in detail in Fig. 4. One of its ends meshes with an idler sheave which is similar to sprocket 8. The conveyor has straight runs between sheave 8 and said companion idler sheave (not shown). This chain comprises a series of spaced blocks 10, each of which is of hollow transverse square cross-section. The square cross-section of block 10 is shown in Fig. 3. Each of these blocks 10 is provided with a central longitudinal cylindrical bore. A yoke 11 is associated with each block 10. Each yoke 11 is connected to a cylindrical bearing member 12, which is located turnably in the central cylindrical bore of the respective block 10, this being the left-hand block in Fig. 4. Each bearing member 12 is provided with a projection 14 which is pivotally connected to the arms of the adjacent yoke 11, by means of a pivot pin 15, whose inner end is threaded. This inner end engages the tapped opening of the corresponding arm of the yoke 11. Therefore each yoke is free to turn around the longitudinal axis of the bore of the respective block 10, and each yoke is free to turn about the respective extension 14, relative to a transverse axis which is perpendicular to said longitudinal axis. Each block 10 fits fairly snugly between the head of one adjacent yoke 11, and the arms of the other adjacent yoke, so that each block 10 is held against substantial longitudinal movement relative to the respective bearing member 12. As shown in Fig. 3, each block 10 is provided with an integral lateral extension 16. As also shown in Fig. 3, each extension 16 is provided with a recess in which the spindle shank 17 of a form-support is held detachably by means of a clamping screw 18. A sleeve 19 is turnably mounted upon each shaft or spindle 17. The sleeve 19 is held against longitudinal movement, relative to its spindle 17, by means of collars 20 which are clamped to the spindle 17 by means of clamping screws 21. A sleeve 22, which is provided with an integral roll 23, is mounted upon the sleeve 19. The sleeve 22 and roll 23 are made of resilient vulcanized rubber or other suitable resilient material. The ends of the sleeve 22 are located between the washers 24 which are fixed, either permanently or detachably, to the sleeve 19. The form F is made of glass or other suitable material and is connected to the rubber sleeve 22, by means of a drive fit or in any other suitable manner.

An additional sleeve 25, which is also made of non-resilient vulcanized rubber, is connected to sleeve 19 by cementing or the like. A washer 26 may be permanently or detachably connected to the sleeve 19, in order to prevent the sleeve 25 from shifting relative to the sleeve 19, in one direction. The interior cylindrical wall of the form F also fits snugly upon the sleeve 25, which is also provided with longitudinal ridges.

At the sprocket 8, the blocks 10 are located between the pairs of teeth 9 of said sprocket. In effect, said blocks 10 mesh with the pairs of teeth 9, so that sprocket 8 drives the endless chain conveyor.

The blocks 10 move slidably between stationary rail members 45 and 46, which are shown in cross-section in Fig. 3. These rail members 45 and 46 are supported at spaced intervals by means of angle irons 47, to which bars 48 are respectively connected by means of screws 49. The angle irons 47 are connected to the fixed frame 50 of the machine by means of screws 51. Each supporting member 47 and a supplemental bar 48 forms in effect a U-shaped supporting member. The rail members 45 and 46 are held between the angle irons 47 and bars 48 by screws 52 and 53. A spacing bar 54 is provided between the rail member 46 and the adjacent portion of the member 47. Another spacing bar 55 is provided between each bar 48, and the adjacent portion of the rail member 45. These spacing bars 54 and 55 are welded or otherwise secured respectively to the members 45 and 46. The screws 52 and 53 respectively pass through tapped holes of the spacing members 54 and 55. The members 45 and 46 are provided in sections, and a supporting member 47, together with its bar 48, is provided at the junction between two successive sections. The spacing bars 54 and 55 are welded to the successive rail members 45 and 46 at each junction, as indicated at W in Fig. 4. The projections 16 of the blocks 10 extend through the openings between the adjacent flanges of the rail members 45 and 46. The bars 48 may be omitted at some of the junctions of the rail members 45 and 46, and the rail members may be connected in any suitable manner to each other and to their supports.

The rail members 45 and 46 are twisted so as to turn the forms into desired positions relative to the vertical plane.

After the objects have been beaded, by means of any conventional type, which are not shown in the drawings, the forms with the rubber objects thereon are passed through a heating tunnel 103. This heating tunnel 103 is provided with a blower fan 104, which is actuated by motor 104a. The direction of the current of heated air in the tunnel 103 may be in the same direction as the movement of the forms, or counter to the direction of the movement of the forms. The function of this heating tunnel 103 is to drive off traces of moisture from the beads, and to ensure the complete vulcanization of the bodies and the beads of the rubber objects, so that the beads are vulcanized integrally to the bodies.

The axes of the forms are maintained vertical in the heating tunnel 103. The temperature in the heating tunnel 103 may be about 300° F.

The rail members 45 and 46 have a common and straight longitudinal axis. The endless conveyor has two straight runs and two curved end-runs. The rail members 45 and 46 are located only at the straight runs of the endless conveyor.

The blocks 10 may be of any suitable non-circular or polygonal contour, so as to provide large bearing surfaces which slidably abut the corresponding inner surfaces of the rail members 45 and 46. Therefore, while it is preferable to provide the outer surfaces of the blocks 10 with square cross-sections, the invention is not limited thereto.

The members 45 and 46 therefore constitute a guide through which a straight run of the endless conveyor is actuated. The inner surface of said guide has a plurality of planar faces. Blocks 10 are form supports, to which the forms F are turnably connected, and said forms F extend laterally relative to said guide. Said guide is twisted relative to its straight longitudinal axis so as to vary the inclinations between the axes of said forms, and a predetermined reference plane. This plane may be the horizontal plane or the vertical plane. Whenever I refer, in the claims, to the polygonal inner surfaces of the guide, I include any non-circular shape. Therefore, if the inner surface of the guide has only a single planar surface, this is within the scope of the invention.

In order to economize space the axes of the forms are turned relative to a predetermined reference plane, in both straight runs of the endless conveyor. The invention is not limited thereto, as the members 45 and 46 can be located wholly along a single straight run of the endless conveyor.

The members 16 constitute means for connecting the forms to the form supports 10. These members 16 extend through a slot of the guide. Said slot does not have a straight longitudinal axis, since said slot is shaped in accordance with the tilting of the axes of the forms, relative to the predetermined reference plane. The members 16 have a substantial clearance in the slot of the guide, since the tilting of the axes of the forms is produced primarily by the snug sliding fit of the planar face or faces of the block 10, against the planar face or faces of the interior surface of the guide.

It will be noted that while the axes of the forms are tilted, the blocks 10 are not turned relative to the respective adjacent portions of the inner surface of the guide.

For convenience the guide is designated as being twisted. In actual practice the rail members 45 and 46 are cast or otherwise made initially in their final form, save that they are machined or otherwise finished, subsequent to the casting.

Whenever I refer to "beading" in the description or claims, I refer to it generally as the formation of a thickened or reinforced zone at an end of the rubber object. In this particular case, the object is padded at its inner or open end.

Figure 2:
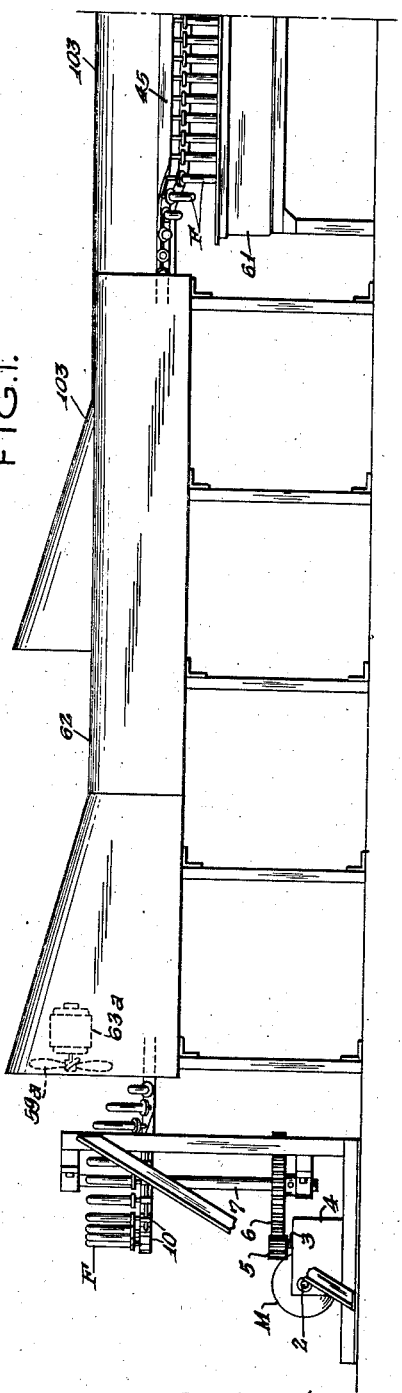
Fig. 2 is a side elevation of Fig. 1.

The rail members 45 and 46 can be made from standard steel tubing which is of rectangular or square or other suitable polygonal cross-section. This steel tubing is cut longitudinal, in order to separate the same into longitudinal halves. The edges can then be twisted by cold working. These sections of the steel tubing are preferably twisted separately into the desired shape. Fig. 2 shows how the forms are passed through a drying tunnel 62 which has an enlargement in which a blower 59a is located. Said blower is operated by an electric motor 63a.

I have shown a preferred embodiment of my invention, but it is clear that numerous changes and omissions can be made without departing from its spirit.

I claim:

1. A machine of the class described, comprising an endless conveyor having longitudinal straight runs and arcuate end runs, drive means engaging an end run of said conveyor and adapted to actuate the conveyor, a hollow guide having a straight longitudinal axis and through which a straight run of said endless conveyor is actuated by said drive means, said guide having a longitudinal slot, the inner surface of said guide having a polygonal cross-section which has planar faces, said endless conveyor having form-supports which are connected to said endless conveyor, said form-supports fitting substantially snugly and slidably against the inner surface of said guide, said form-supports having forms turnably connected thereto by means which extend through said slot, said guide being twisted relative to its straight longitudinal axis so as to vary the angles between the longitudinal axes of said forms and the horizontal plane during the movement of said endless conveyor within said guide.

2. A machine of the class described, comprising an endless conveyor which has a straight run, means adapted to support and to actuate said endless conveyor so that said straight run is moved parallel to its straight longitudinal axis, a guide having a straight longitudinal axis and through which said straight run is actuated, said guide having a slot and having a non-circular inner surface, form-supports connected to said endless conveyor and fitting against the inner surface of said guide so as to prevent said form-supports from turning around said longitudinal axis relative to the respective abutting portions of the inner surface of said guide, said guide having a longitudinal slot, said form-supports having extensions which extend laterally through said slot of the guide, forms external to said guide and connected turnably to said extensions so that each form can turn around its longitudinal axis, said inner surface of the guide being twisted relative to said longitudinal axis so as to tilt the axes of the forms relative to the horizontal plane.

3. A machine of the class described, comprising an endless conveyor which has a straight run, means adapted to support and to actuate said endless conveyor so that said straight run is moved parallel to its straight longitudinal axis, a guide having a straight longitudinal axis and through which said straight run is actuated, said guide having a slot and having a non-circular inner surface which has at least one planar face, form-supports connected to said endless conveyor and fitting against the inner surface of said guide so as to prevent said form-supports from turning around said longitudinal axis relative to the respective abutting portions of the inner surface of said guide, said guide having a longitudinal slot, said form-supports having extensions which extend laterally through said slot of the guide, each said extension having a spindle rigidly connected thereto, each said spindle having a form mounted on said spindle, each form being turnable around its longitudinal axis, said inner surface of the guide being twisted relative to said longitudinal axis so that said planar surface makes different angles with the horizontal plane along the length of said guide.

4. A machine of the class described, comprising an endless conveyor which has a straight run, means adapted to support and to actuate said endless conveyor so that said straight run is moved parallel to its straight longitudinal axis, a guide having a straight longitudinal axis and through which said straight run is actuated, said guide comprising angular rail members and means adapted to hold said rail members in assembled relation, said rail members having adjacent flanges which are spaced from each other so as to provide a longitudinal slot in said guide, the inner cross-section of said rail members being substantially a rectangle which is open at said longitudinal slot, form-supports connected to said endless conveyor, said form-supports having outer surfaces which fit snugly and slidable against the inner surfaces of said rail members, said form-supports having extensions which extend laterally through said slot of the guide, forms external to said guide and connected turnably to said extensions so that each form can turn around its longitudinal axis, each inner surface of each rail member being twisted relative to said longitudinal axis so as to make different angles with the horizontal plane.

5. A machine of the class described, comprising an endless conveyor which has a straight run and curved end runs, said endless conveyor comprising a series of spaced form-supports, each form-support having an axial through-and-through cylindrical bore, yoke members respectively located intermediate said form-supports, each yoke member having a cylindrical spindle portion which is located in the cylindrical bore of the respective form-support so that the form-support is turnable around the longitudinal axis of said bore, each yoke member having a pair of spaced arms which are located at one side of the respective form-support, each yoke member having a single arm located at the other side of the respective form-support, each said single arm being located between and being pivotally connected to the spaced arms of the next adjacent yoke member so that adjacent yoke members are connected to each other to turn around an axis which is perpendicular to the longitudinal axis of the bore, the curved end runs of said endless conveyor being supported on turnable sheaves, one of said sheaves having a recessed periphery which is shaped to admit said yokes and to support said form-supports, said periphery also having teeth which are shaped to intermesh with said spaced form-supports, forms turnably connected to said form-supports so that each form is turnable around its own axis.

6. A machine of the class described, comprising an endless conveyor which has a straight run and curved end runs, said endless conveyor comprising a series of spaced form-supports, each form-support having an axial through-and-through cylindrical bore, yoke members respectively located intermediate said form-supports, each yoke member having a cylindrical spindle portion which is located in the cylindrical bore of the respective form-support so that the form-support is turnable around the longitudinal axis of said bore, each yoke member having a pair of spaced arms which are located at one side of the respective form-support, each yoke member having a single arm located at the other side of the respective form-support, each said single arm being located between and being pivotally connected to the spaced arms of the next adjacent yoke member so that adjacent yoke members are connected to each other to turn around an axis which is perpendicular to the longitudinal axis of the bore, the curved end runs of said endless conveyor being supported on turnable sheaves, one of said sheaves having a recessed periphery which is shaped to admit said yokes and to support said form-supports, said periphery also having teeth which are shaped to intermesh with said spaced form-supports, a guide having a straight longitudinal axis and through which a straight run of said endless conveyor is adapted to be actuated, said guide having a longitudinal slot, said form-supports having extensions which project laterally through said longitudinal slot, forms external to said guide and turnably connected to said extensions so that each form is turnable around its own axis, the outer surface of said form-supports and the inner surface of said guide being shaped to vary the angle between the horizontal plane and the longitudinal axis of each form as each form is moved longitudinally relative to the guide.

FREDERICK J. MAYWALD, Jr.